United States Patent
Li (10) Patent No.: US 8,946,590 B2
(45) Date of Patent: Feb. 3, 2015

(54) METHODS FOR LASER SCRIBING AND SEPARATING GLASS SUBSTRATES

(75) Inventor: Xinghua Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 881 days.

(21) Appl. No.: 12/952,935

(22) Filed: Nov. 23, 2010

(65) Prior Publication Data

US 2011/0127244 A1     Jun. 2, 2011

Related U.S. Application Data

(63) Continuation-in-part of application No. 12/627,172, filed on Nov. 30, 2009, now abandoned.

(60) Provisional application No. 61/322,478, filed on Apr. 9, 2010.

(51) Int. Cl.
*B23K 26/38* (2014.01)
*B23K 26/40* (2014.01)
*C03B 33/09* (2006.01)

(52) U.S. Cl.
CPC ........... *B23K 26/4075* (2013.01); *C03B 33/091* (2013.01)
USPC ............ 219/121.72; 219/121.69; 219/121.68; 219/121.67

(58) Field of Classification Search
USPC .............................. 219/121.65–121.84; 225/2
See application file for complete search history.

(56) References Cited

U.S. PATENT DOCUMENTS 2,959,507 A * 11/1960 Long .............................. 428/142
3,453,097 A * 7/1969 Hafner ............................ 65/112
3,543,979 A 12/1970 Grove et al.
(Continued)

FOREIGN PATENT DOCUMENTS

EP     1341730 B1     8/2005
EP     1862280 A1     5/2007
(Continued)

OTHER PUBLICATIONS

Karube, et al. "Laser-Induced Cleavage of LCD Glass as Full-Body Cutting"; Proceeding of SPIE, vol. 6880; pp. 688007-1 to 688007-10; 2008.

(Continued)

*Primary Examiner* — Henry Yuen
*Assistant Examiner* — Lawrence Samuels
(74) *Attorney, Agent, or Firm* — John T. Haran (57) ABSTRACT

Methods of forming scribe vents in a strengthened glass substrate having a compressive surface layer and an inner tension layer are provided. In one embodiment, a first and second defect is formed to partially expose the inner tension layer. A first scribe vent may be generated in a first scribing direction by translating a laser beam and a cooling jet on a surface of the strengthened glass substrate at a first scribing speed. A second scribe vent intersecting the first scribe vent may be generated in a second scribing direction by translating the laser beam and the cooling jet on the surface of the strengthened glass substrate at a second scribing speed that is greater than the first scribing speed. The defects may be perpendicular to the scribing directions. In another embodiment, the first scribe vent may be fused at an intersection location prior to generating the second scribe vent.

7 Claims, 7 Drawing Sheets

(56) References Cited

U.S. PATENT DOCUMENTS

| | | | |
|---|---|---|---|
| 3,629,545 A | 12/1971 | Graham et al. | |
| 3,629,546 A * | 12/1971 | Fry | 219/121.84 |
| 3,751,238 A | 8/1973 | Grego et al. | |
| 4,403,134 A | 9/1983 | Klingel | |
| 4,467,168 A * | 8/1984 | Morgan et al. | 219/121.67 |
| 4,468,534 A | 8/1984 | Boddicker | |
| 4,639,572 A * | 1/1987 | Gruzman et al. | 219/121.67 |
| 4,702,042 A | 10/1987 | Herrington et al. | |
| 5,084,604 A | 1/1992 | Dekker et al. | |
| 5,132,505 A | 7/1992 | Zonneveld et al. | |
| 5,609,284 A * | 3/1997 | Kondratenko | 225/1 |
| 5,776,220 A * | 7/1998 | Allaire et al. | 65/112 |
| 5,783,289 A | 7/1998 | Suzuki et al. | |
| 5,826,772 A * | 10/1998 | Ariglio et al. | 225/2 |
| 5,961,852 A | 10/1999 | Rafla-Yuan et al. | |
| 5,984,159 A | 11/1999 | Ostendarp et al. | |
| 6,023,039 A | 2/2000 | Sawada | |
| 6,112,967 A * | 9/2000 | Ostendarp et al. | 225/93.5 |
| 6,211,488 B1 | 4/2001 | Hoekstra et al. | |
| 6,222,604 B1 | 4/2001 | Suginoya et al. | |
| 6,252,197 B1 | 6/2001 | Hoekstra et al. | |
| 6,259,058 B1 * | 7/2001 | Hoekstra | 219/121.75 |
| 6,327,875 B1 * | 12/2001 | Allaire et al. | 65/103 |
| 6,420,678 B1 | 7/2002 | Hoekstra | |
| 6,423,930 B1 * | 7/2002 | Matsumoto | 219/121.69 |
| 6,489,588 B1 * | 12/2002 | Hoekstra et al. | 219/121.67 |
| 6,590,181 B2 | 7/2003 | Choo et al. | |
| 6,676,878 B2 * | 1/2004 | O'Brien et al. | 264/400 |
| 6,684,885 B2 * | 2/2004 | Graczyk | 128/858 |
| 6,723,952 B2 | 4/2004 | Choo et al. | |
| 6,734,391 B2 * | 5/2004 | Jeon | 219/121.72 |
| 6,744,009 B1 | 6/2004 | Xuan et al. | |
| 6,787,732 B1 | 9/2004 | Xuan et al. | |
| 6,800,831 B1 | 10/2004 | Hoetzel | |
| 6,811,069 B2 | 11/2004 | Hauer et al. | |
| 6,870,129 B2 | 3/2005 | Hauer et al. | |
| 6,894,249 B1 | 5/2005 | Hauer et al. | |
| 6,919,530 B2 | 7/2005 | Borgeson et al. | |
| 6,992,026 B2 | 1/2006 | Fukuyo et al. | |
| 7,014,082 B2 | 3/2006 | Hauer et al. | |
| 7,211,526 B2 | 5/2007 | Iri et al. | |
| 7,217,448 B2 | 5/2007 | Koyo et al. | |
| 7,304,265 B2 | 12/2007 | Otsu et al. | |
| 7,371,431 B2 | 5/2008 | Dietz et al. | |
| 7,396,742 B2 | 7/2008 | Fukuyo et al. | |
| 7,528,342 B2 | 5/2009 | Deshi | |
| 7,626,137 B2 | 12/2009 | Fukuyo et al. | |
| 7,628,303 B2 | 12/2009 | Hoetzel | |
| 7,629,250 B2 | 12/2009 | Benson et al. | |
| 7,638,730 B2 | 12/2009 | Yoo et al. | |
| 7,642,483 B2 | 1/2010 | You et al. | |
| 7,723,212 B2 | 5/2010 | Yamamoto et al. | |
| 7,723,641 B2 | 5/2010 | Fujii | |
| 7,726,532 B2 | 6/2010 | Gonoe | |
| 7,772,522 B2 * | 8/2010 | Matsumoto et al. | 219/121.72 |
| 7,812,281 B2 | 10/2010 | Acker et al. | |
| 7,816,623 B2 | 10/2010 | Otsu et al. | |
| 7,820,941 B2 | 10/2010 | Brown et al. | |
| 7,977,602 B2 | 7/2011 | Birrell | |
| 8,011,207 B2 | 9/2011 | Abramov et al. | |
| 8,051,679 B2 | 11/2011 | Abramov et al. | |
| 8,053,704 B2 | 11/2011 | Abramov et al. | |
| 8,067,713 B2 | 11/2011 | Yue | |
| 8,071,960 B2 | 12/2011 | Hoeche | |
| 8,110,776 B2 | 2/2012 | Jung et al. | |
| RE43,400 E * | 5/2012 | O'Brien et al. | 264/400 |
| 8,171,753 B2 | 5/2012 | Abramov et al. | |
| 8,173,038 B2 | 5/2012 | Wagner | |
| 8,269,138 B2 | 9/2012 | Garner et al. | |
| 8,426,767 B2 | 4/2013 | Glaesemann et al. | |
| 8,551,865 B2 | 10/2013 | Fukuyo et al. | |
| 8,720,228 B2 * | 5/2014 | Li | 65/97 |
| 2002/0006765 A1 * | 1/2002 | Michel et al. | 451/28 |
| 2003/0217568 A1 | 11/2003 | Koyo et al. | |
| 2004/0060416 A1 | 4/2004 | Luiz | |
| 2004/0086688 A1 | 5/2004 | Hirano et al. | |
| 2004/0144231 A1 | 7/2004 | Hanada | |
| 2004/0169023 A1 | 9/2004 | Tanaka | |
| 2004/0251290 A1 * | 12/2004 | Kondratenko | 225/2 |
| 2005/0029239 A1 * | 2/2005 | Matsumoto et al. | 219/121.72 |
| 2005/0029321 A1 | 2/2005 | Hauer et al. | |
| 2005/0199592 A1 | 9/2005 | Iri et al. | |
| 2005/0221044 A1 * | 10/2005 | Gaume et al. | 428/43 |
| 2006/0021977 A1 | 2/2006 | Menegus | |
| 2006/0081101 A1 | 4/2006 | Hayashi et al. | |
| 2006/0081571 A1 | 4/2006 | Hoebel et al. | |
| 2006/0101858 A1 | 5/2006 | Fujii | |
| 2006/0137505 A1 | 6/2006 | Wakayama | |
| 2007/0039932 A1 | 2/2007 | Haase et al. | |
| 2007/0051706 A1 | 3/2007 | Bovatsek et al. | |
| 2007/0062921 A1 * | 3/2007 | Karube et al. | 219/121.72 |
| 2007/0151962 A1 * | 7/2007 | Doll et al. | 219/121.72 |
| 2007/0164072 A1 | 7/2007 | Nishio | |
| 2007/0170162 A1 | 7/2007 | Haupt et al. | |
| 2007/0178672 A1 | 8/2007 | Tanaka | |
| 2007/0228100 A1 * | 10/2007 | Gonoe | 225/1 |
| 2008/0000884 A1 | 1/2008 | Sugiura et al. | |
| 2008/0053972 A1 | 3/2008 | Otsu et al. | |
| 2008/0110952 A1 | 5/2008 | Kemmerer et al. | |
| 2008/0128953 A1 | 6/2008 | Nagai et al. | |
| 2008/0194079 A1 | 8/2008 | Yamamoto et al. | |
| 2008/0283509 A1 | 11/2008 | Abramov et al. | |
| 2008/0292844 A1 | 11/2008 | Sabia et al. | |
| 2008/0305615 A1 | 12/2008 | Ueno et al. | |
| 2009/0014492 A1 | 1/2009 | Haase | |
| 2009/0040640 A1 * | 2/2009 | Kim et al. | 359/894 |
| 2009/0126403 A1 | 5/2009 | Abramov et al. | |
| 2009/0159580 A1 | 6/2009 | Hsu et al. | |
| 2009/0220761 A1 | 9/2009 | Dejneka et al. | |
| 2009/0294419 A1 | 12/2009 | Abramov et al. | |
| 2009/0294420 A1 | 12/2009 | Abramov et al. | |
| 2010/0012633 A1 | 1/2010 | Atsumi et al. | |
| 2010/0078417 A1 | 4/2010 | Abramov et al. | |
| 2010/0089882 A1 | 4/2010 | Tamura | |
| 2010/0119846 A1 * | 5/2010 | Sawada | 428/426 |
| 2010/0206008 A1 * | 8/2010 | Harvey et al. | 65/105 |
| 2010/0210442 A1 | 8/2010 | Abramov et al. | |
| 2010/0212361 A1 | 8/2010 | Abramov et al. | |
| 2010/0258993 A1 | 10/2010 | Zhou et al. | |
| 2010/0287991 A1 | 11/2010 | Brown et al. | |
| 2010/0294748 A1 * | 11/2010 | Garner et al. | 219/121.72 |
| 2011/0000897 A1 | 1/2011 | Nakano et al. | |
| 2011/0000898 A1 | 1/2011 | Rumsby | |
| 2011/0027971 A1 | 2/2011 | Fukuyo et al. | |
| 2011/0037149 A1 | 2/2011 | Fukuyo et al. | |
| 2011/0049765 A1 * | 3/2011 | Li et al. | 264/400 |
| 2011/0095062 A1 | 4/2011 | Maekawa | |
| 2011/0250423 A1 | 10/2011 | Fukasawa et al. | |
| 2012/0000894 A1 | 1/2012 | Abramov et al. | |
| 2012/0047956 A1 | 3/2012 | Li et al. | |
| 2012/0135847 A1 | 5/2012 | Fukasawa et al. | |
| 2013/0323469 A1 | 12/2013 | Abramov et al. | |

FOREIGN PATENT DOCUMENTS

| | | |
|---|---|---|
| GB | 1222182 A | 2/1971 |
| JP | 2000219528 A | 8/2000 |
| JP | 2001-80928 | 3/2001 |
| JP | 2001058281 A | 3/2001 |
| JP | 2004-10466 | 1/2004 |
| JP | 2004083378 A | 3/2004 |
| JP | 2004352535 A | 12/2004 |
| JP | 2005-212473 | 8/2005 |
| JP | 2006159747 A | 6/2006 |
| JP | 2008007360 A | 1/2008 |
| JP | 2008007384 A | 1/2008 |
| JP | 2008229711 A | 10/2008 |
| JP | 2009066851 A | 4/2009 |
| JP | 2009090598 A | 4/2009 |
| JP | 2009-280452 | 12/2009 |
| JP | 2010-150068 | 7/2010 |
| WO | 93/20015 | 10/1993 |
| WO | 02/100620 A1 | 12/2002 |
| WO | 03/008352 A1 | 1/2003 |

(56) References Cited

FOREIGN PATENT DOCUMENTS

| WO | 2004/014625 | A1 | 2/2004 |
| WO | 2007094348 | A1 | 8/2007 |
| WO | 2010138451 | A2 | 12/2010 |

OTHER PUBLICATIONS

Yamamoto et al. "Three-Dimensional Thermal Stress Analysis on Laser Scribing of Glass"; ScienceDirect, Precision Engineering, 32 (2008) 301-308.

Yamamoto et al. "Thermal Stress Analysis on Laser Scribing of Glass", Journal of Laser Applications; vol. 20, No. 4, Nov. 2008, pp. 193-200.

Hamamatsu Photonics K.K. Electron Tube Division; "Stealth Dicing Technology and Applications", Mar. 2005.

Kumagai, et al. "Advanced Dicing Technology for Semiconductor Wafer—Stealth Dicing." Semiconductor Manufacturing, IEEE Transactions on Semiconductor Manufacturing, vol. 20, No. 3, Aug. 2007, pp. 259-265.

Communication under Rule 71(3) EPC (Intention to Grant) issued Sep. 17, 2013, relating to EP Patent Application No. 10784931.7 filed Nov. 24, 2010.

Extended European Search Report dated Jul. 22, 2014 relating to EP Divsional Patent Application No. 14152259.9.

Japanese First Office Action issued Jun. 17, 2014, relating to JP Patent Application No. 2012-542099 filed Nov. 24, 2010.

\* cited by examiner

METHODS FOR LASER SCRIBING AND SEPARATING GLASS SUBSTRATES

CROSS-REFERENCE TO RELATED APPLICATIONS

This is a continuation-in-part of U.S. patent application Ser. No. 12/627,172 entitled "Methods for Scribing and Separating Glass Substrates," filed on Nov. 30, 2009, now abandoned and claims priority of U.S. Patent Application Ser. No. 61/322,478 entitled "Methods of Forming Scribe Vents in Strengthened Glass Substrates," filed Apr. 9, 2010, which are hereby incorporated by reference in their entirety.

BACKGROUND

1. Field

The present specification generally relates to methods for separating strengthened glass substrates and, more specifically, to methods for forming scribe vents to separate strengthened glass substrates.

2. Technical Background

Thin glass substrates have a variety of applications in consumer electronic devices. For example, glass substrates may be used as cover sheets for LCD and LED displays incorporated in mobile telephones, display devices such as televisions and computer monitors, and various other electronic devices. Cover sheets used in such devices may be formed by sectioning or separating a large glass substrate into a plurality of smaller glass substrates using various laser cutting techniques. For example, glass substrates may be separated by scribe-and-break techniques. However, when the scribe-and-break techniques are utilized to separate strengthened glass substrates such as ion-exchanged glass, uncontrollable full-body separation rather than the formation of a scribe line may occur. The uncontrolled separation generally leads to poor edge characteristics compared to the scribe and break process. Moreover, full-body separation of the substrate along the line of separation prevents the formation of additional, intersecting vents in a single strengthened glass substrate.

Accordingly, a need exists for alternative methods for forming scribe vents and separating strengthened glass substrates.

SUMMARY

In one embodiment, a method of forming intersecting scribe vents in a strengthened glass substrate having a compressive surface layer and an inner tension layer includes forming a first and second defect through the compressive surface layer to partially expose the inner tension layer. The first defect may be perpendicular to a first scribing direction and offset from a first edge of the strengthened glass substrate. The second defect may be perpendicular to a second scribing direction and offset from a second edge of the strengthened glass substrate. The method further includes generating a first scribe vent through the compressive surface layer in the first scribing direction by translating a laser beam and a cooling jet on a surface of the strengthened glass substrate at a first scribing speed. The first scribe vent may be initiated at the first defect and terminated at a first termination location that is offset from an edge of the strengthened glass substrate. A second scribe vent may be generated through the compressive surface layer in the second scribing direction by translating the laser beam and the cooling jet on the surface of the strengthened glass substrate at a second scribing speed that is similar or greater than or equal to the first scribing speed. The second scribe vent may be initiated at the second defect, intersect the first scribe vent at an intersection location, and terminated at a second termination location that is offset from an edge of the strengthened glass substrate.

In another embodiment, a method of forming intersecting scribe vents in a strengthened glass substrate having a compressive surface layer and an inner tension layer includes generating a first scribe vent in a first scribing direction through the compressive surface layer by translating a laser beam and a cooling jet on a surface of the strengthened glass substrate. The first scribe vent may be fused at an intersection location. The method further includes generating a second scribe vent in a second scribing direction through the compressive surface layer by translating the laser beam and the cooling jet on the surface of the strengthened glass substrate. The second scribe vent traverses the first scribe vent at the intersection location.

In yet another embodiment, a method of forming a scribe vent in a strengthened glass substrate having a compressive surface layer and an inner tension layer includes forming a defect through the compressive surface layer to partially expose the inner tension layer. The defect is perpendicular to a scribing direction and is offset from a first edge of the strengthened glass substrate. The method may further include generating a scribe vent through the compressive surface layer by translating a laser beam and a cooling jet on a surface of the strengthened glass substrate such that scribe vent is initiated at the defect and is terminated at a termination location that is offset from a second edge of the strengthened glass substrate.

Additional features and advantages of the methods will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION OF THE PREFERRED EMBODIMENTS

Reference will now be made in detail to various embodiments of forming scribe vents extending partially through the thickness of strengthened glass substrates, examples of which are illustrated in the accompanying drawings. Whenever possible, the same reference numerals will be used throughout the drawings to refer to the same or like parts. As described herein, methods for forming a scribe vent in a strengthened glass substrate generally comprise forming a perpendicular defect through a compressive surface layer such that the defect is offset from a first edge of the strengthened glass substrate. An exposed inner tension layer below the compressive layer of the glass facilitates vent initiation during the laser scribing process. A beam spot of a laser source is then directed onto the compressive layer along a desired line of separation. A cooling spot produced by a cooling jet is directed onto the compressive layer such that the cooling spot is positioned proximate the trailing edge of the beam spot. The cooling spot and the beam spot are then advanced along the desired line of separation by translating the laser source and cooling jet, or by translating the strengthened glass substrate until the beam spot is positioned at a termination location that is offset from a second edge of the strengthened glass substrate, thereby forming a vent extending partially through the thickness of the strengthened glass substrate. The formed scribe vent extends from the offset defect to the termination location. Intersecting scribe vents may be formed by forming a first scribe vent at a first scribing speed and forming an intersecting second scribe vent at a second scribing speed that is greater than the first scribing speed. In another embodiment, the first scribe vent is fused at an intersecting location prior to forming the second scribe vent. Various embodiments for forming scribe vents in strengthened glass substrates as well as methods for separating strengthened glass substrates into a plurality of pieces will be described in more detail herein.

Figure 1A:
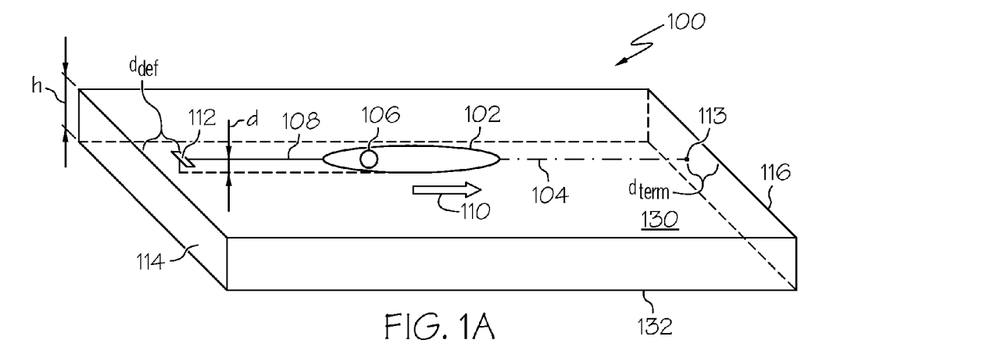
FIGS. 1A and 1B schematically depict a perspective view of an off-edge defect, an elliptical beam spot of a laser beam, and a cooling spot of a cooling jet incident on a strengthened glass substrate according to at least one embodiment shown and described herein.
Figure 2:
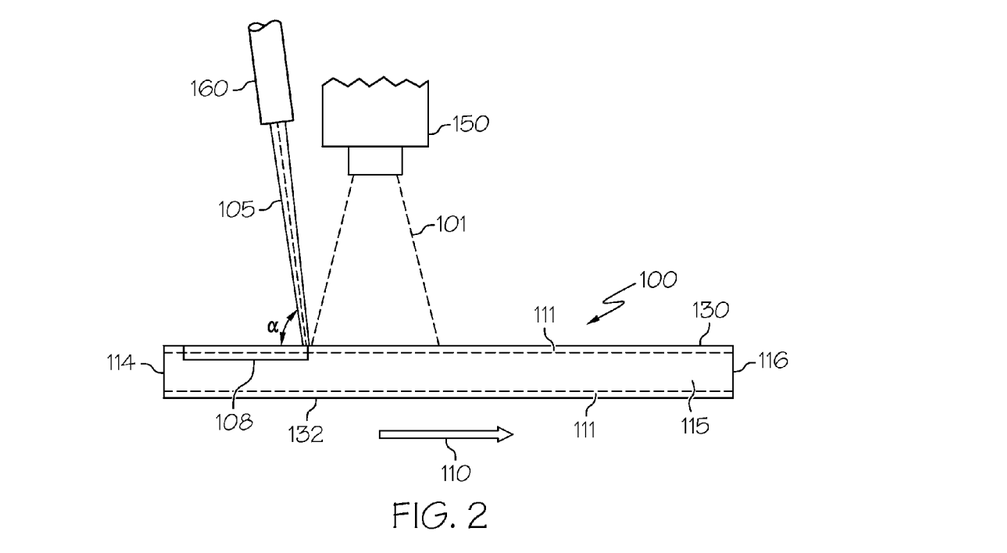
FIG. 2 schematically depicts a cross section of the laser beam, cooling jet, and strengthened glass substrate of FIG. 1A or 1B according to at least one embodiment shown and described herein.
Figure 5:
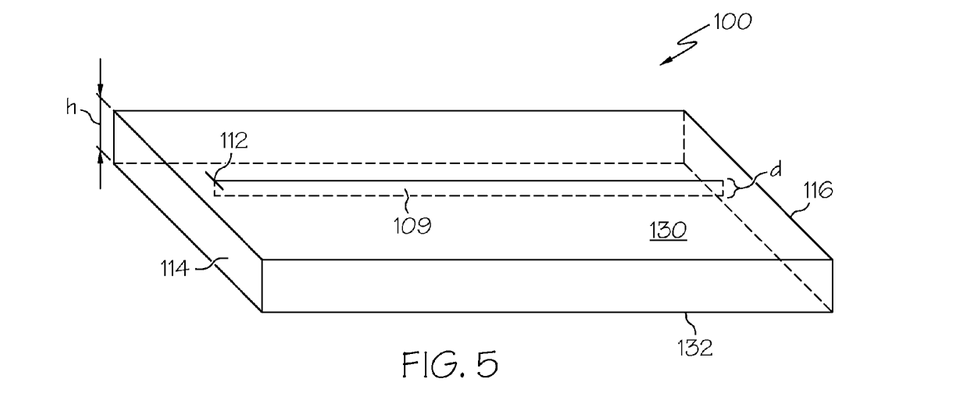
FIG. 5 schematically depicts a perspective view of a completed scribe vent according to at least one embodiment shown and described herein.

Referring to FIGS. 1A, 2 and 5, an exemplary system for forming a controlled crack or scribe vent 109 extending partially through the thickness of a strengthened glass substrate 100 is schematically depicted. The system generally comprises a laser source 150 for heating the strengthened glass substrate 100 along a desired line of separation 104 and a nozzle 160 for directing a cooling jet 105 for quenching the heated surface of the strengthened glass substrate 100 along the desired line of separation 104. The resulting change in temperature of the strengthened glass substrate due to the application of the beam spot 102 and cooling spot 106 causes tensile stresses to develop along the desired line of separation 104 in a direction perpendicular to the desired line of separation 104, thereby forming a vent 109 which extends partially through the thickness of the strengthened glass substrate 100. The completed scribe vent 109 is positioned along the desired line of separation 104 of which the strengthened glass substrate 100 may be separated by the application of mechanical force. As described in more detail below, the scribe vent 109 is initiated at a defect 112 that is offset from a first edge 114 of the strengthened glass substrate 100 and terminates at a termination location that is offset from a second edge 116 of the strengthened glass substrate 100.

In the embodiments described herein, the strengthened glass substrate 100 has a first surface 130, a second surface 132, edges (e.g., first edge 114 and second edge 116) and a thickness h. It should be understood that the strengthened glass substrate may have other shapes, such as circular. The strengthened glass substrate may be chemically strengthened by an ion-exchange process to produce compressive surface layers 111 extending to a depth of layer (DOL) and an inner tension layer 115 within the strengthened glass substrate. The strengthened glass substrate may be formed from various glass compositions including, without limitation, borosilicate glasses, aluminosilicate, and aluminoborosilicate glasses.

The strengthened glass substrate 100 may be securely maintained within the system by the use of mechanical or vacuum chucking. Vacuum chucking may be achieved by a series of vacuum holes spaced some distance apart on the vacuum platen. However, the stress gradient generated by the holes may distort the stress field enough to affect the laser scribing process of the strengthened glass substrate. The stress gradient from the vacuum suction can be minimized by using closely spaced holes or a porous plate because both decrease the amount of vacuum needed to hold down the glass.

The laser source 150 is operable to emit a beam having a wavelength suitable for imparting thermal energy to the strengthened glass substrate 100 such that the laser energy is strongly absorbed through the glass thickness h, thereby heating the strengthened glass substrate. For example, the laser source 150 generally emits a laser beam 101 having a wavelength in the infrared range. Suitable laser sources include a CO laser with a wavelength from about 5 µm to about 6 µm, a HF laser with a wavelength from about 2.6 µm to about 3.0 µm, or an erbium YAG laser with a wavelength of about 2.9 µm. In the embodiments describe herein, the laser source is a $CO_2$ laser which produces a beam of infrared light having a wavelength from about 9.4 µm to about 10.6 µm. The $CO_2$ laser source may be an RF-excited laser source operated in quasi-continuous wave mode. In one embodiment, the laser source 150 is operated to produce an output beam in the TEM$_{00}$ mode such that the laser beam 101 of the laser source 150 has a Gaussian intensity distribution. Alternatively, the laser source may be operated to produce an output beam in the TEM$_{01}$ mode such that the output beam has a "D" or flat mode intensity distribution. The output power of the laser source may be from about 20 watts to greater than 500 watts depending on the desired scribing speed, the composition of the glass being scribed, and the depth of the compressive surface layer.

In order to avoid overheating the surface of the strengthened glass substrate 100 (which may lead to ablation or vaporization of glass from the surface of the strengthened glass substrate or residual stresses which weaken the cut edge), the beam 101 emitted by the laser source may be shaped with various optical elements (not shown) such that the beam 101 has an elliptical beam spot 102 on the surface of the strengthened glass substrate 100. For example, in one embodiment, a pair of cylindrical lenses (not shown) is disposed in the path of the laser beam 101 emitted from the laser source 150. Alternatively, the cylindrical lenses and/or other optical elements used for shaping the laser beam to form an elliptical beam spot are integral with the laser source 150. The cylindrical lenses shape the laser beam 101 such that the beam spot incident on the surface of the strengthened glass substrate is generally elliptical in shape, as depicted in FIG. 1A. Although beam spots described herein may be elliptical in shape, it should be understood that embodiments are not limited thereto as the beam spot may have other shapes including circular, square, rectangular, etc.

Figure 3:
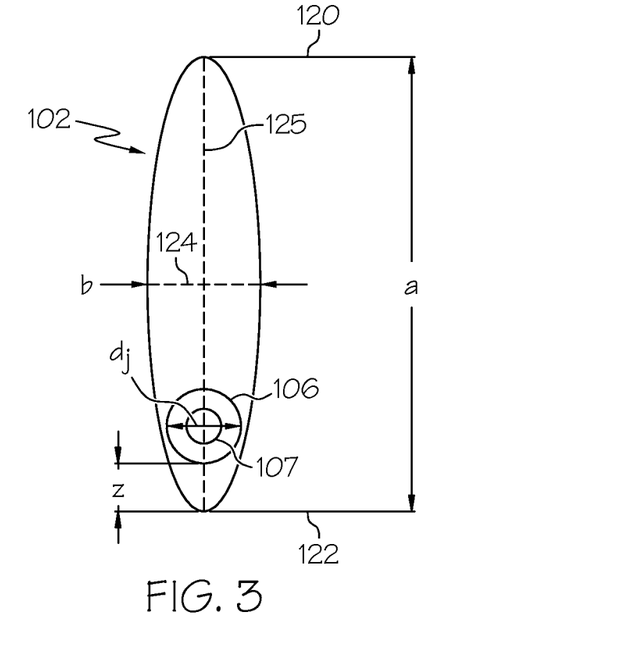
FIG. 3 schematically depicts the relative positioning of the elliptical beam spot and cooling spot according to at least one embodiment shown and described herein.

Referring to FIG. 3, the elliptical beam spot 102 generally has a minor axis 124 of width b and a major axis 125 of length a. The minor axis 124 extends across the midpoint of the elliptical beam spot 102 as shown in FIG. 3. In one embodiment, the width b of the minor axis 124 is approximately the same as a diameter of the cooling spot 106 formed where the cooling jet contacts a surface of the strengthened glass substrate.

The major axis 125 generally has a length a between the leading edge 120 and the trailing edge 122 of the elliptical beam spot 102, as shown in FIG. 3. The length a of the elliptical beam spot 102 may generally control the depth of the laser generated vent. The longer the laser beam spot, the deeper the vent. If the length a is fixed, an increase in scribing speed v produces a more shallow vent. Conversely, the slower the scribing speed v, the deeper the vent that is created. For laser scribing strengthened glass substrates, the vent depth should be controlled such that vent growth will be slow enough to complete the laser scribing operation. This means that the length of the laser beam should be fixed in accordance with a desired scribing speed for a given strengthened glass substrate thickness.

Regarding laser power of the laser beam 101, the laser power that may be used to heat the strengthened glass substrate may be limited by the instantaneous and average power density. The instantaneous power density may be defined as the instantaneous laser power P$_{inst}$ divided by the area of the beam spot. The average power density I$_{average}$ may be defined as the laser power P divided by the sum of the laser beam spot size and the laser beam transversed area per unit of time:

$$I_{average} = \frac{P}{\pi \cdot a \cdot b \div 4 + b \cdot v}, \quad \text{Eq. (1)}.$$

The maximum permissible laser power density to heat the strengthened glass substrate without generating stress relaxation depends on the glass properties such as thermal capacity, thermal diffusivity and light absorption at the laser wavelength, glass softening point, etc. If I$_{average}$ is set to equal I$_{max}$, the following is derived:

$$b = \frac{P}{I_{max}} \cdot \frac{1}{\frac{\pi}{4} \cdot a + v}, \quad \text{Eq. (2)}.$$

Therefore, the width b of the elliptical beam spot may be controlled to achieve the desired average power density as the length a may be fixed to achieve a desired vent depth. More specifically, Eq. (2) illustrates that 1) given a fixed laser power and maximum permissible laser power density, the width b of the of elliptical beam spot should be increased with decreasing laser scribing speed, 2) because the laser scribing speed decreases with an increase of the depth of layer, the laser beam width b should be increased correspondingly, and 3) an increase of the laser power requires an increase of the laser beam width b provided that the laser scribing speed is kept at a constant speed. With increasing glass thickness and depth of layer, the amount of glass volume that needs to be heated also increases. Because the power density is limited to a certain value, to increase the laser power, the width b of the elliptical beam spot should be increased.

It is noted that heat loss due to thermal diffusion will also be present during the scribing process. Thermal diffusion reduces the local glass temperature from laser heating. Since the heat loss is proportional to the local temperature gradient, to generate the required tensile stress on the propagating vent front, it may be necessary to reduce the temperature gradient at the vent front location prior to and during quenching. This may be achieved by using a wider elliptical beam spot to heat up the volume of the strengthened glass substrate adjacent to the vent front. Alternatively, in one embodiment, a laser beam with an intensity profile that has a uniform distribution along the minor axis may be utilized to reduce the temperature gradient and increase the temperature at the vent front. Generally, the thicker the strengthened glass substrate, the deeper the vent and the wider the laser beam along the width b.

Referring to FIGS. 2 and 3, the cooling jet 105 generally comprises a flow of pressurized fluid emitted from a nozzle 160 and directed onto the surface of the strengthened glass substrate 100. The pressurized fluid may comprise a liquid, such as, for example, water, ethanol, liquid nitrogen and/or a chemical coolant. Alternatively, the cooling jet 105 may comprise a compressed gas such as, for example, compressed air, compressed nitrogen, compressed helium or a similar compressed gas. The cooling jet may also comprise a mixture of liquid and compressed gas (i.e., a mist jet comprising compressed di-ionized water and air or nitrogen). In the embodiments described herein the cooling jet is de-ionized water. In general, a solid stream water jet may be effective to create a shallow vent because of the concentrated cooling on a small area, while a mist jet may produce a deeper vent and have a broader process window. A mist jet may be applied to a greater area and remove much of the heat on the surface of the strengthened glass substrate.

The cooling jet 105 is emitted from an orifice (not shown) in the end of the nozzle. The cooling spot 106 formed where the cooling jet is incident on the surface of the strengthened glass substrate has a diameter d$_j$ which is larger than the orifice in the nozzle 160. The nozzle 160 is positioned behind the laser source 150 with respect to the scribing direction 110 (i.e., a cutting axis). In the embodiments described herein, the nozzle 160 is oriented at an angle with respect to the surface 130 of the strengthened glass substrate 100 such that the cooling jet 105 is incident on the surface of the strengthened glass substrate at an angle α which is less than 90 degrees relative to the surface of the strengthened glass substrate. In one embodiment, the cooling jet 105 may be translated in coordination with the translating beam spot 102. In another embodiment, the strengthened glass substrate 100 may be mounted on a translation table capable of translating the strengthened glass substrate 100 under the beam 101 and cooling jet 105. The cooling jet 105 may be directed onto the surface of the strengthened glass substrate 100 at an area that is adjacent to the elliptical beam spot.

Referring to FIGS. 1A-5, a method of forming a scribe vent comprising a vent extending partially through the thickness h of a strengthened glass substrate 100 may include first introducing a defect 112 on a first surface 130 (i.e., the surface of the compressive surface layer 111) of the strengthened glass substrate 100 to form a scribe vent initiation point. The defect 112 is offset from the first edge 114 of the strengthened glass substrate by a defect offset distance $d_{def}$. The defect 112 may be an initiation crack that is formed mechanically or by laser ablation, for example. The offset distance $d_{def}$ may depend on the desired scribing speed, the composition of the glass being scribed, and the depth of the compressive surface layer 111. In one embodiment, the offset distance $d_{def}$ is approximately 6 mm In other embodiments, the offset distance may be in the range of about 3 mm to about 10 mm. As described in more detail below, a vent originates from the defect and propagates along a relative motion of the strengthened glass substrate 100 with respect to the laser beam and cooling jet.

Figure 1B:
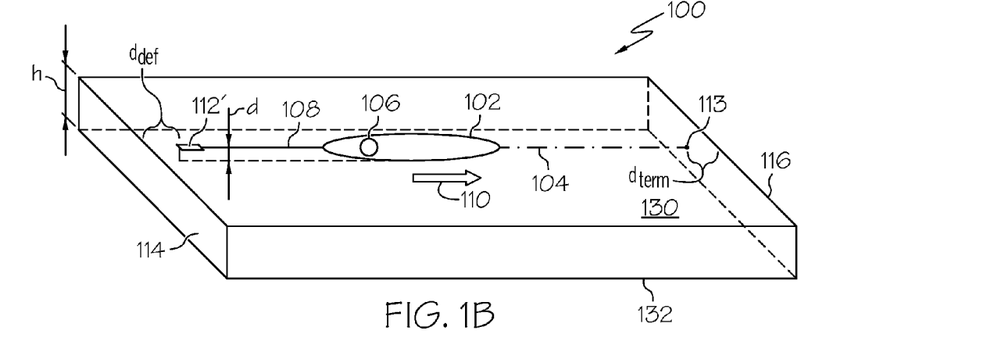

The defect 112 may be an initiation crack that is perpendicular to a scribing direction and the desired line of separation. The perpendicular orientation of the defect 112 may yield increased mechanical repeatability over a defect that is parallel to the scribing direction. For example, the perpendicular orientation of the defect 112 may prevent full-body vents from forming during the scribing process. However, in some embodiments, it may be desirable to provide a defect 112' that is parallel to the scribing direction as illustrated in FIG. 1B, depending on the composition and the physical cracking mechanism of the strengthened glass substrate being separated.

The defect 112 may be preferably formed mechanically by an application of a diamond scriber, although other mechanical devices may be utilized such as a mechanical scoring wheel, a grinding wheel, a carbide tip, an engraver, etc. The depth of the defect 112 should be equal to or slightly greater than the depth of layer such that the inner tension layer is exposed. Care should be taken when forming the defect to ensure that the defect does not extend too deeply into the inner tension layer. Therefore, the mechanical device should not be so sharp and the applied force too great that the resulting defect is too deep into the bulk of the strengthened glass substrate. Deep median cracks generated by the application of a sharp mechanical device may penetrate into the inner tension layer too deeply and cause a full-body crack during the laser scribing process. Defects having many lateral and radial cracks and shallow median cracks that only partially expose the inner tension layer may be achieved by the use of blunt mechanical devices. The type of mechanical device chosen may depend on the characteristics of the strengthened glass substrate, such as the strength of the glass. A cone-shaped diamond tip that is dragged on the surface of the strengthened glass substrates generally produces more lateral cracks and fewer median cracks. A scoring wheel may produce deep median cracks that may cause a strengthened glass substrate to fully separate during the laser scribing process.

As an example and not a limitation, an air actuated cylinder was used to apply a cone-shaped diamond scriber to the surface of a 1.1 mm thick ion-exchanged strengthened glass substrate having a 30 μm, 760 MPa compressive stress layer and a 21 MPa inner tension layer. The strengthened glass substrate was an aluminosilicate glass comprising 69.17 mol % $SiO_2$; 8.53 mol % $Al_2O_3$; 0 mol % $B_2O_3$; 13.94 mol % $Na_2O$; 1.17 mol % $K_2O$; 6.45 mol % MgO; 0.54 mol % CaO; and 0.19 mol % $SnO_2$. The cone-shaped diamond tip had an angle of about 105°. The air-actuated cylinder applied the diamond tip to the surface of the strengthened glass substrate at a force of about 9 Newtons, a scoring speed of about 5 mm/s, and a dragging angle of about 12°. The process yielded a perpendicular defect that partially exposed the inner tension layer. The properties of the diamond tip and scoring process may depend on the properties of the strengthened glass substrate (e.g., the thickness of the glass substrate, the thickness and compressive stress of the compressive stress layer, etc.). A cone-shaped diamond tip having an angle within a range of about 90° and 130°, and an applied force between about 5 and about 20 Newtons may be utilized depending on the properties of the strengthened glass substrate. As another example and not a limitation, the cone-shaped diamond tip may have a 120° cone angle and be applied to the strengthened glass substrate at a dragging angle of 5°, a speed of 3 mm/s, and an applied force of 13 N.

After the defect 112 is formed, a beam 101 from the laser source 150 is directed onto the surface of the strengthened glass substrate 100 such that the beam is incident on the desired line of separation 104 at the defect 112. The beam is initially directed onto the substrate such that the defect 112 is positioned within the elliptical beam spot 102 of the beam 101 and the major axis 125 of the elliptical beam spot 102 is substantially collinear with the desired line of separation 104. When the beam of the laser source 150 is positioned on the surface 130 of the strengthened glass substrate 100, the beam imparts radiant thermal energy to the compressive surface layer 111 thereby heating the strengthened glass substrate along the desired line of separation 104. The maximum temperature $T_{max}$ to which the glass surface is heated is generally less than the strain point of the glass $T_g$ so as to avoid stress relaxation during heating and the development of undesirable residual stresses following quenching by the cooling jet. The temperature of the strengthened glass substrate may be controlled by adjusting various parameters including, for example, the power of the laser source and the scribing speed v with which the beam of the laser is advanced over the surface of the strengthened glass substrate along the desired line of separation, as described above. After the beam 101 is initially positioned on the desired line of separation 104, the elliptical beam spot 102 is advanced along the surface 130 of the strengthened glass substrate 100 on the desired line of separation 104 at the scribing speed v until reaching the termination location 113 that is offset from the second edge 116, thereby heating the surface of the strengthened glass substrate along the desired line of separation 104 between the defect 112 and the termination location 113. The elliptical beam spot may be translated over the surface by moving the laser source 150 relative to the strengthened glass substrate 100. Alternatively, the elliptical beam spot may be translated by moving the strengthened glass substrate 100 relative to the laser source 150 and nozzle 160.

Figure 4:
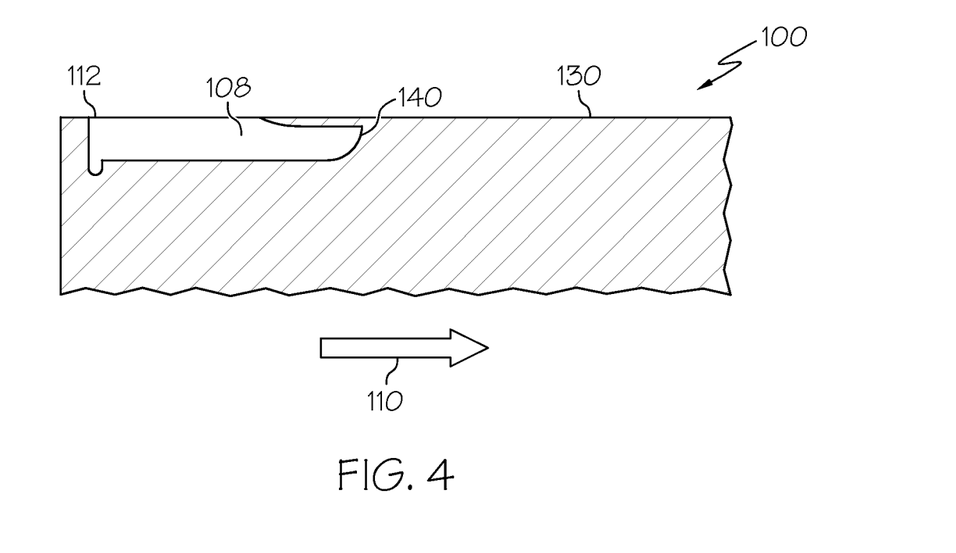
FIG. 4 schematically depicts a cross section of a scribe vent and a vent front according to at least one embodiment shown and described herein.

In order to form a scribe vent 109 in the surface 130 of the strengthened glass substrate, the heated surface of the strengthened glass substrate is cooled or quenched with the cooling jet 105 emitted from the nozzle 160. The change in temperature due to quenching causes tensile stresses to develop in the surface of the strengthened glass substrate in a direction perpendicular to the desired line of separation 104. Referring to FIG. 4, these tensile stresses cause a vent front 140 to propagate under the surface of the strengthened glass substrate in the scribing direction 110 along the desired line of separation 104 and stop proximate the termination location 113 prior to the second edge 116. The termination location 113 may be offset from the second edge 116 by a termination distance $d_{term}$. In the embodiments described herein, the vent 109 may extend beneath the surface of the substrate to a depth d which is less than a quarter of the thickness h of the strengthened glass substrate. In one embodiment, the depth d is approximately 15% of the thickness h of the strengthened glass substrate. In order to initiate and propagate the vent 109 along the surface of the strengthened glass substrate, a threshold change in temperature $\Delta T_{TH}$ should be exceeded by the heating and subsequent cooling of the surface of the strengthened glass substrate in order to generate tensile stresses sufficient for vent initiation and propagation.

More specifically, heating the strengthened glass substrate with the laser source 150 and quenching the heated surface of the strengthened glass substrate with the cooling jet 105 generates a tensile stress in the surface of the strengthened glass substrate perpendicular to the desired line of separation 104. If the tensile stress exceeds the threshold tensile stress $\sigma_{TH}$ of the material from which the strengthened glass substrate 100 is formed, a preexisting crack or vent 109 can be propagated in the strengthened glass substrate. The laser generated tensile stress due to the heating and cooling cycle may be estimated by:

$$\sigma_{TH} = \frac{1}{2} \alpha \cdot E \cdot \Delta T, \quad \text{Eq. (3)}$$

where a is the coefficient of thermal expansion, E is the Young's modulus, and $\Delta T$ is the temperature drop from the laser beam and cooling jet quenching cycle. Using Eq. (3), the maximum tensile stress that may be generated during the laser heating and cooing jet quenching cycle cannot exceed about 100 to about 200 MPa for any type of glass. This value is significantly less than the surface compression (e.g., >500 MPa) produced through the ion-exchange process. Therefore, the laser scribing process does not generate enough tensile stress to propagate a scribe vent that is totally enclosed in the compressive layer. Rather, the scribing process on strengthened glass substrates is an indirect process.

Referring to FIG. 4, the tensile stresses described above cause a vent front 140 to propagate along the surface 130 of the strengthened glass substrate in the scribing direction 110 on the desired line of separation. As illustrated in FIG. 4, the vent front 140 travels beneath the surface 130 of the strengthened glass substrate 100. Due to the opening of the vent 109 below the glass surface, the surface compression stress is relieved and breakthrough of the vent 109 to the glass surface occurs after the vent front 140 as the vent front propagates within the strengthened glass substrate.

As the vent front 140 travels below the surface 130 and within the compressive surface layer 111, efficient and sustained quenching may be needed to generate the tensile stress to propagate the scribe vent 109 at or around the compressive surface layer 111. The quenching efficiency may depend on the cooling jet 105 impact speed, the volumetric flow of the cooling jet 105 provided by the nozzle 160, and the temperature gradient of the cooling jet 105 relative to the heated strengthened glass substrate 100. In one embodiment, the temperature of the cooling jet 105 (e.g., water) is cooled to a stable temperature to just above 0° Celsius. The temperature and the flow rate of the cooling jet 105 should remain stable throughout the process to achieve proper scribe vent depth.

Qualitatively, in an ideal system, the characteristic resident cooling time of the cooling jet on the strengthened glass substrate surface is equal to $d_j/v$, where $d_j$ is the diameter of the cooling jet core and v is the scribing speed. The cooling jet core 107 is the central region of the cooling spot 106 where the cooling jet impacts the surface of the strengthened glass substrate. Assuming that the vent front is located at the depth of layer/within the strengthened glass substrate, the time needed for the quenching effect to reach a depth of layer value l may be estimated using a one-dimensional heat conduction model. The model predicts that the characteristic time is $l/_{4D}$ where D is the thermal diffusivity of the strengthened glass substrate. Therefore, the diameter $d_j$ of the cooling jet may be qualitatively estimated by:

$$d_j \approx \frac{l^2}{4D} \cdot v, \quad \text{Eq. (4).}$$

The above equation illustrates the correlation between the cooling jet diameter $d_j$ and the depth of layer of the strengthened glass substrate. The cooling time should be increased correspondingly with an increase of the depth of layer.

The cooling spot 106 may be located proximate the trailing edge 122 of the elliptical beam spot 102. Referring to FIGS. 1A-3, in one embodiment described herein, the nozzle 160 is oriented such that the cooling spot 106 is positioned on the surface 130 of the strengthened glass substrate 100 on the desired line of separation 104 and within the elliptical beam spot 102. More specifically, the nozzle 160 of the illustrated embodiment is oriented such that the cooling spot 106 is located within the elliptical beam spot 102 between the center of the elliptical beam spot and the trailing edge 122 of the elliptical beam spot such that the cooling spot is spaced apart from the trailing edge by a distance z, as shown in FIG. 3. In this position the cooling spot 106 is at or near the maximum temperature on the surface of the strengthened glass substrate due to heating by the laser source. Accordingly, because the strengthened glass substrate is quenched by the cooling jet at or near the maximum temperature, the resulting change in temperature $\Delta T$ (assuming the glass surface is heated to just below the strain temperature $T_g$) exceeds the change in temperature threshold $\Delta T_{TH}$ thereby facilitating the formation of the vent 109 which initially propagates from the defect 112. Although the figures illustrate the cooling spot located within the elliptical beam spot and separated by a distance z, the cooling spot may be located directly on the trailing edge 122 or partially outside of the elliptical beam spot proximate the trailing edge, or lagging behind the elliptical beam spot by several millimeters. For example, for thicker strengthened glass substrates, the cooling spot may be positioned closer toward or within the elliptical beam spot. For thinner strengthened glass substrates, the cooling spot may be positioned within the elliptical beam spot. Generally, the thinner the strengthened glass substrate, the shorter the distance of the cooling jet to the location of $T_{max}$.

Referring to FIGS. 1A, 2 and 5, after the cooling jet 105 and cooling spot 106 are properly oriented with respect to the elliptical beam spot 102, the cooling jet and laser source are advanced along the surface 130 of the strengthened glass substrate 100 on the desired line of separation 104 in the scribing direction 110 starting at the defect 112 and terminating at the termination location 113. As the surface of the strengthened glass substrate is heated to the maximum temperature and quenched at or near the maximum temperature, a scribe vent 109 is propagated from the defect 112 to the termination location 113 along the desired line of separation 104. The cooling jet/laser source and the strengthened glass substrate 100 are advanced relative to one another at a scribing speed v which, in turn, is the speed of vent propagation along the desired line of separation 104. The scribing speed v is generally selected such that overheating of the surface of the strengthened glass substrate is avoided while still allowing the surface of the strengthened glass substrate to be heated to just below the strain temperature of the glass. Ensuring that scribe vent 109 extends between the defect and the termination location and not from the first edge to the second edge prevents an uncontrollable full-body vent from propagating and destroying the strengthened glass substrate 100. Following formation of the scribe vent 109, a bending moment may be applied (e.g., by hand) to the strengthened glass substrate 100 on one or both sides of the vent thereby mechanically separating the strengthened glass substrate along the scribe vent 109.

In one embodiment, the system may be operated such that the beam spot is advanced along the desired line of separation starting prior to the first edge and after the second edge such that the beam spot traverses both the first and second edges. To create a scribe vent that is positioned only between the defect and the termination point and does not extend from the first edge to the second edge, the cooling jet may be operated in an "off" mode when the beam spot generated by the laser beam is incident on the strengthened glass substrate prior to the defect and after the termination location, and operated in an "on" mode when the beam spot is incident on the strengthened glass substrate on the defect and between the defect and the termination location. Therefore, the cooling spot is only provided on the surface of the strengthened glass substrate from the defect to the termination location. Operating the cooling jet in this manner prevents quenching of the strengthened glass substrate prior to the defect and after the termination location which thereby prevents a vent from opening in these locations and results in a scribe vent that extends from the defect to the termination location.

In another embodiment, the cooling jet may be operated in a continuously on mode such that a cooling spot is provided on the surface of the strengthened glass substrate from the first edge to the second edge. In this embodiment, the laser source may be operated at a low power level when the laser beam is incident on the strengthened glass substrate prior to the defect and after the termination location, and at a high power level when the laser beam is incident on the strengthened glass substrate between the defect and the termination location. The low power level may be an off mode (i.e., zero radiation), or some sufficiently low power level such that the laser beam does not heat the strengthened glass substrate to a temperature sufficient to open a vent. The high power level may be a power level that is operable to open a vent as described hereinabove. Operating the laser source in this manner provides for controlled vent propagation between the defect and the termination location and not at the edges of the strengthened glass substrate.

Prevention of a vent from extending past the termination location toward the second edge may also be realized by operating the laser source at an increased power level near the termination location so that the vent propagation outruns the translation speed of the strengthened glass substrate. In the laser scribing operation, the laser generated vent may typically propagates at the same speed as the relative motion of the laser beam and cooling jet with respect to the strengthened glass substrate. However, increasing the lasing power of the laser source may cause the vent to outrun the translation speed of the strengthened glass substrate such that the vent propagates into a laser heated region provided by the laser beam spot. When the vent front 140 enters the laser heated region, it becomes quenched by the increased power of the laser source in conjunction with the cooling jet and stops progressing altogether. Therefore, vent propagation may be controllably stopped by increasing the power of the laser source near the termination location.

Preventing a vent from opening between the first edge and the defect and between the termination location and the second edge may also be realized by translating the strengthened glass substrate at a high speed when the laser beam is located between the first edge and the defect and between the termination location and the second edge, and at a low speed when the laser beam is located between the defect and the termination location. This may be described as a speed profile of the relative motion between the strengthened glass substrate and the laser beam. The high speed should be a glass translation speed that is fast enough to prevent the opening of a vent while the low speed should be a glass translation speed that is capable of opening a vent to form a scribe vent (i.e., scribing speed v). By speeding up the glass translation before the defect and after the termination point, the scribe vent may be formed only between the defect and the termination location.

Figure 6:
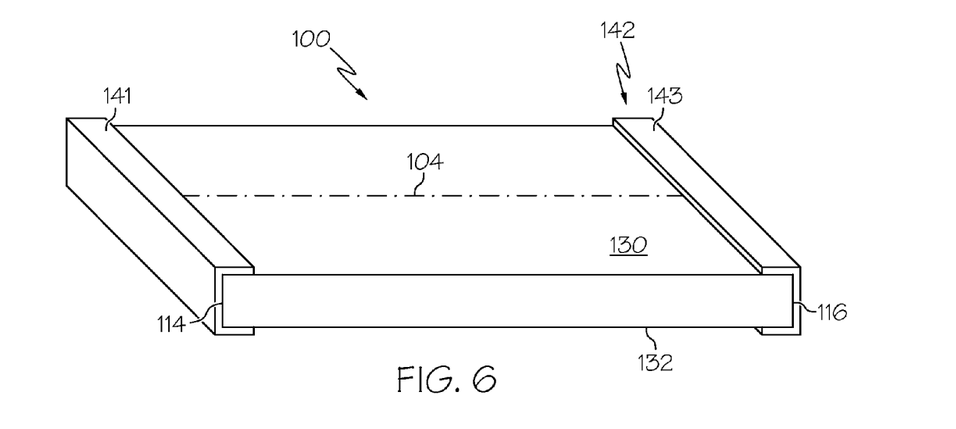
FIG. 6 schematically depicts a perspective view of laser shields on a surface of a strengthened glass substrate according to at least one embodiment of the method shown and described herein.

Referring to FIG. 6, embodiments of the methods described herein may also utilize laser shields 141, 142 to prevent the beam spot and cooling spot from reaching the surface of the strengthened glass substrate in a shielded region that is located on a perimeter of the strengthened glass substrate positioned between the edges of the glass substrate and the respective defects and termination locations. For example, a shielded region may extend from the defect 112 to the first edge 114 as well as from the termination location 113 to the second edge 116. The laser shields 141, 142 may comprise a material such as a metal material, for example, capable of preventing laser radiation from entering and heating the strengthened glass substrate in the shielded regions. In the embodiment illustrated in FIG. 6, a first laser shield 141 is configured to be applied to the strengthened glass substrate 100 at the first edge 114 such that a first shielding surface 141 covers a first shielded region. Similarly, a second laser shield 142 is configured to be applied to the strengthened glass substrate 100 at the second edge 116 such that a second shielding surface 143 covers a second shielded region. It should be understood that other laser shield configurations may be utilized. For example, the laser shields may be configured as a flat metal sheet that is attached to the strengthened glass substrate 100 (e.g., only the top surface of the strengthened glass substrate is shielded at the first edge and the second edge). As the strengthened glass substrate is translated with respect to the beam spot and cooling jet, the laser shields 141, 142 prevent the vent from opening in the first and second shielded regions thereby enabling a scribe vent that extends from the defect to the termination point.

In another embodiment, a thin thermally conductive coating may be deposited on the edges of the strengthened glass substrate 100 as laser shields. For example, the thin thermally conductive coating may be a metal electrode material that is typically used to form contacts on a touch-sensitive screen. The thermally conductive coating may be applied to the strengthened glass substrate 100 using a mask. This material may also provide the thermal shielding effect described above.

The methods described hereinabove can be used to form one or more vents in strengthened glass substrates facilitating the use of the scribe-and-break technique to separate such strengthened glass substrates into a plurality of smaller pieces. For example, FIGS. 7-11 graphically depict methods for separating a strengthened glass substrate 100 into a plurality of pieces using the vent formation methods described herein.

Figure 7:
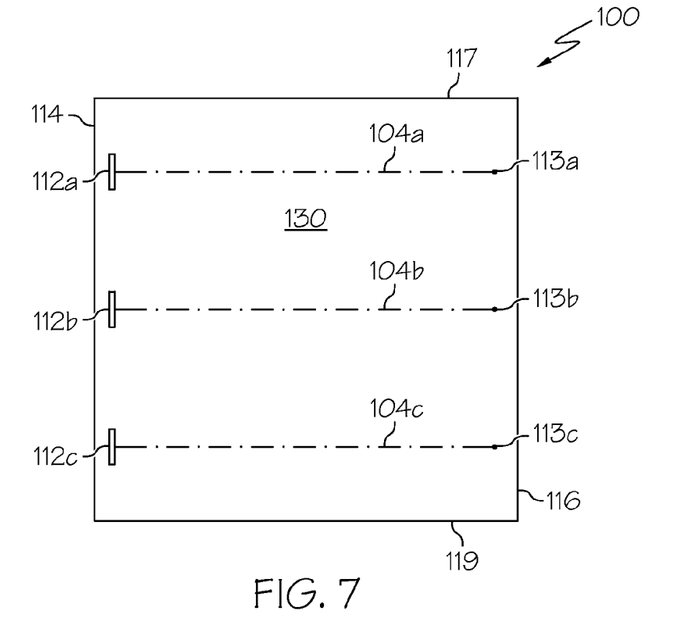
FIG. 7 schematically depicts a top view of a plurality of off-edge defects and desired lines of separation in a first direction according to at least one embodiment shown and described herein.

Referring to FIG. 7, a strengthened glass substrate 100 is depicted which comprises an upper surface or first surface 130. The strengthened glass substrate 100 is separated into a plurality of pieces by introducing a first perpendicular defect 112a into the surface of the strengthened glass substrate 100 on the first surface 130 that is offset from a first edge 114 as described above. The first perpendicular defect 112a may be formed in the surface of the strengthened glass substrate 100 using a mechanical scribe, such as a diamond tip or carbide point or wheel, or by laser ablation. A plurality of additional perpendicular defects such as second perpendicular defect 112b and third perpendicular defect 112c may also be applied to the first surface 130 to generate additional scribe vents thereby enabling the strengthened glass substrate 100 to be separated into a plurality of pieces. Any number of additional defects may be introduced to the first surface 130.

A vent may then be opened in the strengthened glass substrate 100 along a first desired line of separation 104a extending through the first perpendicular defect 112a to a first termination location 113a using one or more of the vent formation techniques described hereinabove. For example, in one embodiment, an elliptical beam spot of a $CO_2$ laser is directed onto the first perpendicular defect 112a such that the major axis of the elliptical beam spot is substantially aligned on the first desired line of separation 104a. A cooling jet is also directed onto the strengthened glass substrate such that the cooling spot of the cooling jet is positioned proximate the trailing edge of the beam spot.

The elliptical beam spot and the cooling spot are then directed over the surface of the strengthened glass substrate along the first desired line of separation 104a thereby opening a first vent in the strengthened glass substrate that extends partially through the thickness of the strengthened glass substrate and forms a first scribe vent, as described above. In general, the first vent in the strengthened glass substrate 100 generally extends through less than a quarter of the thickness h of the strengthened glass substrate.

Similarly, a second scribe vent may be formed along a second desired line of separation 104b starting at the second perpendicular defect 112b and terminating at a second termination location 113b, and a third scribe vent is formed along a third desired line of separation 104c starting at the third perpendicular defect 112c and terminating at a third termination location 113c, as described above regarding the formation of the first scribe vent.

Once the first, second and third scribe vents have been formed in the strengthened glass substrate 100, the strengthened glass substrate may be mechanically separated into a plurality of pieces along the scribe vents by applying a bending moment thereto. For example, once the strengthened glass substrate is separated along the first scribe vent by applying a bending moment to the strengthened glass substrate 100 about the first scribe vent, the resulting pieces may be further separated into smaller pieces by applying a bending moment about the second scribe and third scribe vents. In this manner, the strengthened glass substrate 100 may be divided into four discrete pieces. It should be understood that more or fewer scribe vents may be formed to separate the strengthened glass substrate into more or fewer discrete pieces.

The methods of forming scribe vents described herein may also be utilized to cross-scribe strengthened glass substrates. To cross-scribe a strengthened glass substrate, two intersecting scribe vents may be formed in the bulk of the strengthened glass substrate. Laser cross-scribing involves laser scribing in one direction, followed by laser scribing in a second direction.

Figure 8:
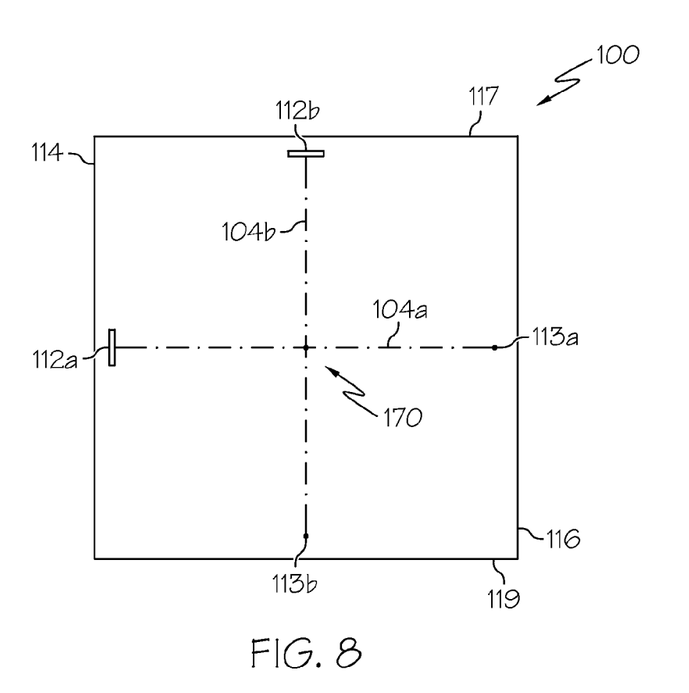
FIG. 8 schematically depicts a top view of a two off-edge defects and intersecting desired lines of separation in a first and second scribing direction according to at least one embodiment shown and described herein.
Figure 9:
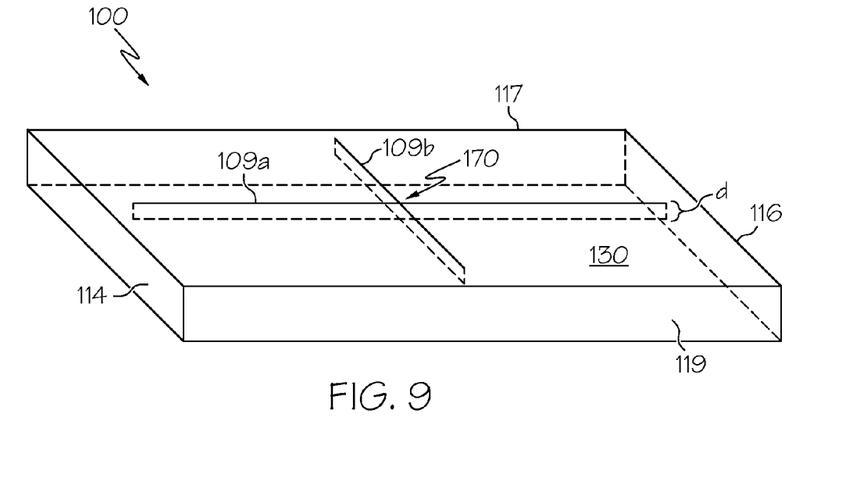
FIG. 9 schematically depicts a perspective view of a first and second scribe vent intersecting at an intersection location according to at least one embodiment shown and described herein.

Referring to FIG. 8, a first perpendicular defect 112a may be introduced proximate a first edge 114 and a second perpendicular defect 112b may be introduced proximate a third edge 117. The first and second perpendicular defects 112a, 112b are positioned on first and second lines of desired separation 104a, 104b, respectively. The first and second lines of desired separation 104a, 104b intersect one another at intersection location 170. As described above, a laser beam and a cooling jet may be translated on the surface of the strengthened glass substrate 100 to open scribe vents 109a and 109b that terminate at first and second termination locations 113a and 113b, respectively as shown in FIG. 9. The first and second termination locations 113a and 113b are proximate second and forth edges 116 and 119, respectively. Although the strengthened glass substrate 100 is illustrated as a square configuration, other configurations are possible, such as a circular configuration, for example. In such circular configurations, there may not be discrete edges, such as first, second, third and fourth edges, for example. The edges are delineated herein as first, second third and fourth edges for ease of discussion and not as a limitation.

Referring to FIG. 9, cross-scribing of glass substrates require that the second scribe vent 109b traverse the first scribe vent 109a at an intersection location 170 during the second laser scribing pass. Due to discontinuity at the first scribe vent 109a formed during the first scribing pass, the local glass substrate temperature at the intersection location 170 is greater than other regions along the second desired line of separation 104b during the second scribing pass. Because the temperature is greater at the intersection location 170, the second vent 109b will travel under the first scribe vent 109a and deeper into the inner tension layer at the intersection location. This leads to higher tension at the vent front 140 (FIG. 4). The higher temperature at the vent front 140 and the localized thermal expansion may result in vent growth that is deeper proximate the intersection location 170 than other regions along the second desired line of separation 104b.

Figure 10A:
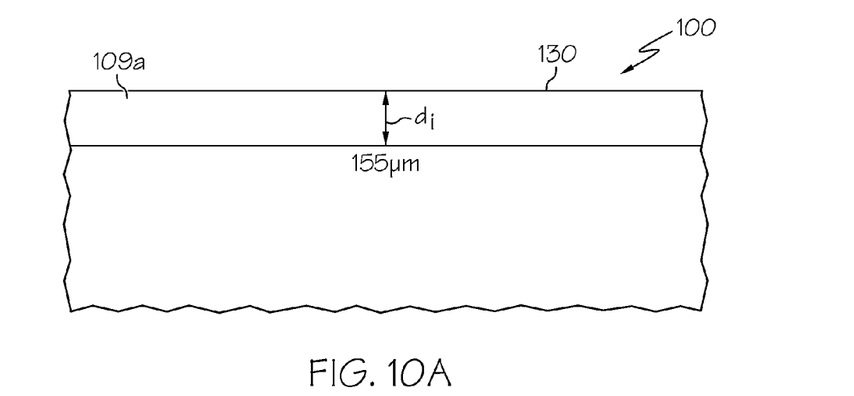
FIG. 10A schematically depicts a side view of a first scribe vent along a first scribing direction according to at least one embodiment shown and described herein.

As an example and not a limitation, FIG. 10A schematically illustrates a cross-sectional view of a first scribe vent 109a formed in 1.1 mm thick aluminosilicate glass substrate that was chemically strengthened by an ion-exchange process. The depth of the compressive stress layer was about 34 μm and the compressive stress was about 620 MPa. The center tension within the inner tension layer was about 21 MPa. The first scribe vent 109a shown in FIG. 10A was generated by the application of a $CO_2$ laser beam operated at a frequency of 20 kHz, an 18% duty cycle, and an output power of 182 W. The laser beam and cooling jet were translated at a scribing speed of 162 mm/s The $CO_2$ laser beam generated an elliptical beam spot having a length a of 42 mm and a width b of 2.5 mm The cooling jet was water at a flow rate of 16 sccm. The resulting first scribe vent 109a had a vent depth $d_i$ of about 155 μm.

Figure 10B:
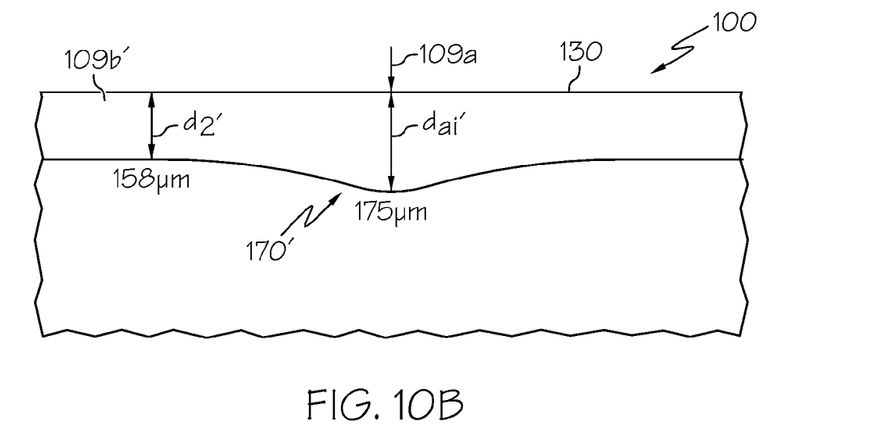
FIG. 10B schematically depicts a side view of a second scribe vent along a second scribing direction intersecting with a first scribe vent along a first scribing direction.

FIG. 10B illustrates a cross-sectional view of a second scribe vent 109b' generated by the same scribing process as the first scribe vent 109a. The location of the first scribe vent 109a is indicated by the arrow labeled 109a. The schematic illustration shows a strengthened glass substrate that was first mechanically broken along the second scribe vent 109b'. Therefore, the first scribe vent 109a is illustrated as into and out of the paper. The second scribe vent 109b' has a vent depth $d_2$' of about 158 μm in regions other than at the intersection location 170'. However, the second scribe vent 109b' travels beneath the first scribe vent 109a at the intersection location 170' at a vent depth $d_{ai}$' of about 175 μm.

In one embodiment, the vent depth $d_{2i}$ at the intersection location 170 may be minimized by increasing the scribing speed during the second scribing pass such that the scribing speed during the second scribing pass is greater than the scribing speed during the first scribing pass. When the second scribe vent 109b crosses the first scribe vent 109a at the intersection location 170, the vent depth $d_{ai}$ of the second scribe vent 109b at the intersection location 170 may be similar to the vent depth $d_i$ of the first scribe vent 109a.

Figure 10C:
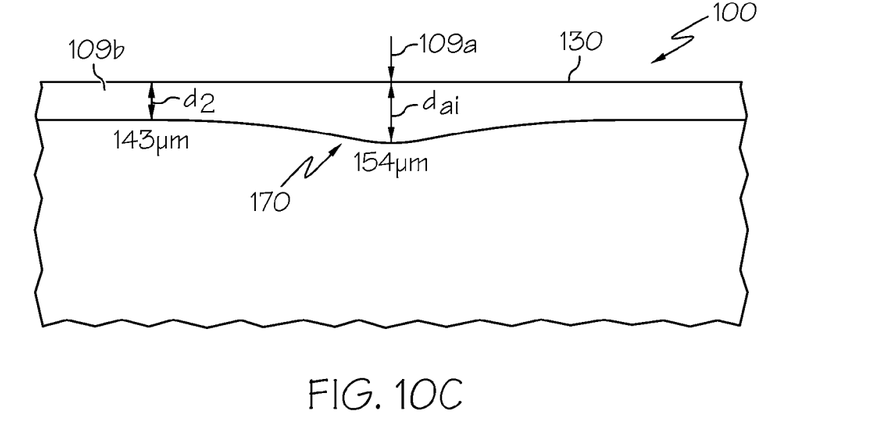
FIG. 10C schematically depicts a side view of a second scribe vent along a second scribing direction intersecting with a first scribe vent along a first scribing direction according to at least one embodiment shown and described herein.

FIG. 10C illustrates an example of intersecting scribe vents 109a and 109b wherein the scribing speed was greater during the second scribing pass than during the first scribing pass. The first scribe vent 109a was generated as described above and its location is indicated by the arrow labeled 109a. In this example, the scribing speed during the second scribing pass was about 172 mm/s Because of the higher scribing speed, the vent depth $d_2$ of the second scribe vent 109b at regions other than the intersection location 170 was about 143 μm. As shown in FIG. 10C, the vent depth $d_{ai}$ of the second scribe vent 109b at the intersection location 170 is about 154 μm, which is less than the 155 μm of vent depth $d_i$ of the first scribe vent 109a. Therefore, uncontrollable full-body separation at the intersection location 170 may be avoided by the more shallow vent depth $d_{ai}$ of the second scribe vent 109b at the intersection location 170.

In another embodiment, the vent depth $d_{ai}$ of the second scribe vent 109b at the intersection location 170 may be minimized by first fusing the first scribe vent 109a at the intersection location 170 prior to creating the second scribe vent 109b. By fusing the first scribe vent 109a, the second vent 109b may experience fewer perturbations at the intersection location 170 during the second scribing pass.

The first scribe vent 109a may be fused at the intersection location 170 by generating a vent preparation line during a vent preparation pass of the laser beam and cooling jet. The vent preparation line may be aligned with the second desired line of separation 104b (FIG. 8) such that the laser beam and cooling jet will follow the same path when forming the second scribe vent 109b. The translation speed of the laser beam and cooling jet during the vent preparation pass is greater than the scribing speed during the first and second scribing passes. For example, in one embodiment, the translation speed may be 10% or more faster during the vent preparation pass than during the first and second scribing passes.

Due to the discontinuity at the intersection location 170 created by the first scribe vent 109a, the glass material will overheat at the intersection location 170 during the vent preparation pass such that softening or melting of the glass material occurs. In such a manner, the first scribe vent 109a may be fused at the intersection location 170. The laser beam and cooling jet may be operated only at the intersection location(s) during the vent preparation pass or continuously operated along the second desired line of separation 104b. The vent preparation pass may be performed by the laser beam that creates the first and/or second scribe vents, or by the use of a separate laser beam.

After the vent preparation pass is completed, the second scribe vent 109b may be formed using the same laser scribing process that was utilized to form the first scribe vent 109a. The second scribe vent 109b will traverse the first scribe vent 109a, which is fused or sealed at the intersection location 170. The vent preparation pass may minimize the vent depth $d_{2i}$ of the second scribe vent 109b at the intersection location to reduce the occurrence of full-body separation.

As an example and not a limitation, a chemically strengthened aluminosilicate glass substrate having about 625 MPa compressive stress within a 36 μm deep compressive stress layer (depth of layer) and a central tension of about 21 MPa was separated using the vent preparation pass method described above. The size of the strengthened glass substrate was 370 mm by 470 mm. A $CO_2$ laser was operated at 20 kHz with an 18% duty cycle and a laser power of 181 W. The laser beam was configured to generate an elliptical beam spot having a length a of 41 mm and a width b of 2.5 mm. The cooling jet was a water jet produced by a nozzle having a 150 μm orifice and a 14 sccm flow rate. The scribing speed during the first scribing pass was 162 mm/s. A vent preparation pass was performed to generate a vent preparation line prior to the second scribing pass. The translation speed of the laser beam and cooling jet during the vent preparation pass was 180 mm/s. After the vent preparation pass, a second scribe vent was generated during a second scribing pass wherein the scribing speed during the second scribing pass was 162 mm/s. The strengthened glass substrate was successfully cross-scribed.

Figure 11:
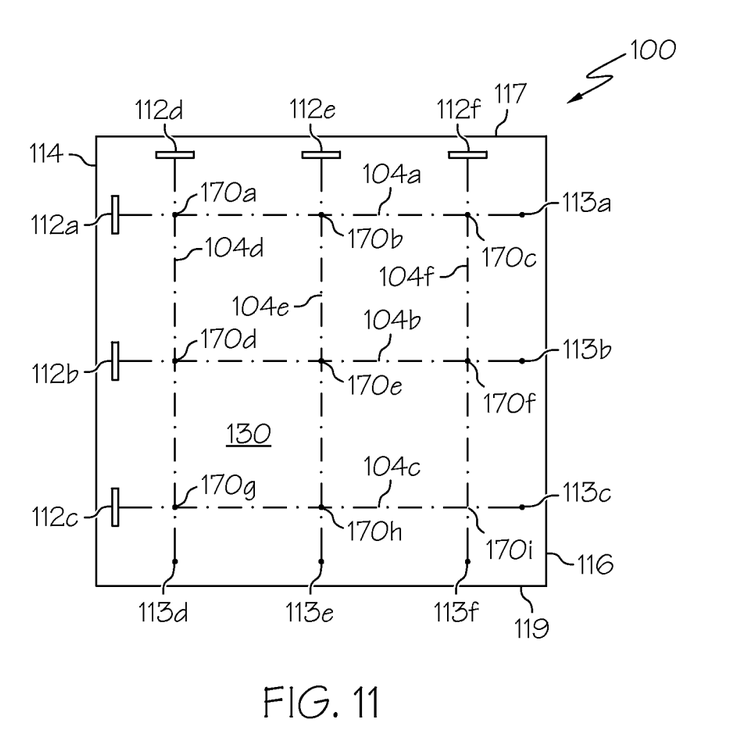
FIG. 11 schematically depicts a top view of a plurality of off-edge defects and desired lines of separation in a first scribing direction and second scribing direction according to at least one embodiment shown and described herein.

Referring now to FIG. 11, multiple intersecting scribe vents may be formed within strengthened glass substrates. Perpendicular off-edge defects (112d-112f) may be formed on a third edge 117 of the strengthened glass substrate to form a second set of scribe vents that intersect a first set of scribe vents comprising the first, second and third scribe vents described above at respective intersection points 170a-170i. It should be understood that the first and second sets of scribe vents may comprise any number of scribe vents. A fourth defect 112d, fifth defect 112e and sixth defect 112f may be formed that are offset from the third edge 117. As described above, the defects may be formed by mechanical scribe or laser ablation, for example. The defects 112d-112f may be positioned on and perpendicular to fourth, fifth and sixth desired lines of separation 104d-f that intersect the first, second and third desired lines of separation 104a-c that intersect at intersection locations 170a-i, respectively. Although fourth, fifth and sixth desired lines of separation 104d-f are illustrated as perpendicular to the first, second and third desired lines of separation 104a-c, embodiments are not limited thereto. For example, the desired lines of separation may be angled or curved to create a desired shape of the separated glass pieces. Fourth, fifth and sixth scribe vents may be generated between the fourth, fifth and sixth defects 112d-f and fourth, fifth and sixth termination locations 113d-f, respectively.

The first and second set of scribe vents may be formed in accordance with the cross-scribing methods described above. For example, the first set of scribe vents (i.e., first, second and third scribe vents) may be formed as described above. Following the formation of the first set of scribe vents, the second set of scribe vents (i.e., fourth, fifth and sixth scribe vents) may be formed by a second scribing pass having a scribing speed that is faster than a scribing speed of the first scribing pass. In another embodiment, a vent preparation pass may be utilized prior to forming the second set of scribe vents. A single laser beam and cooling jet may be used to form each scribe vent, or a plurality of laser beams and cooling jets may be used. For example, the number of laser beams and cooling jets may be equal to the number of desired scribe vents such that each scribe vent is formed by a corresponding laser beam and cooling jet.

It should now be understood that the methods described herein may be used to separate strengthened glass substrates such as strengthened glass substrates made from borosilicate glasses, as well as strengthened glass substrates formed from aluminosilicate glasses including ion-exchange strengthened aluminosilicate glasses. Methods described herein enable strengthened glass substrates to be separated by a scribe-and-break process wherein a scribe vent is formed on a surface of the glass substrate that does not contact an edge of the glass substrate. Strengthened glass substrates having scribe vents described herein applied thereto may be separated by an application of force to the glass substrate along the scribe vent. The methods described herein also enable strengthened glass substrates to be cross-scribed by forming intersecting scribe vents.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of forming intersecting scribe vents in a strengthened glass substrate comprising a compressive surface layer and an inner tension layer, the method comprising:
    forming a first perpendicular defect on a surface of the strengthened glass substrate through the compressive surface layer to partially expose the inner tension layer, wherein the first perpendicular defect is offset from a first edge of the strengthened glass substrate and is perpendicular to a first scribing direction;
    forming a second perpendicular defect on the surface of the strengthened glass substrate through the compressive surface layer to partially expose the inner tension layer, wherein the second perpendicular defect is offset from a second edge of the strengthened glass substrate and is perpendicular to a second scribing direction;
    generating a first scribe vent through the compressive surface layer in the first scribing direction by translating a laser beam and a cooling jet on a surface of the strengthened glass substrate at a first scribing speed, wherein the first scribe vent is initiated at the first perpendicular defect and is terminated at a first termination location that is offset from an edge of the strengthened glass substrate; and
    generating a second scribe vent through the compressive surface layer in the second scribing direction by translating the laser beam and the cooling jet on the surface of the strenghtened glass substrate at a second scribing speed that is greater than or equal to the first scribing speed, wherein the second scribe vent is initiated at the second perpendicular defect, intersects the first scribe vent at an intersection location, and is terminated at a second termination location that is offset from an edge of the strengthened glass substrate.

2. The method as claimed in claim 1 wherein the second scribing speed is such that a depth of the second scribe vent within the strengthened glass substrate is more shallow than a depth of the first scribe vent at regions other than the intersection location.

3. The method as claimed in claim 1 wherein the second scribing speed is between about 2% and about 10% greater than the first scribing speed.

4. The method as claimed in claim 1 further comprising applying one or more laser shields to a shielded region of the strengthened glass substrate located along a perimeter of the strengthened glass substrate between the edges and the first and second perpendicular defects and the first and second termination locations, wherein the laser shields prevent the laser beam and the cooling jet from being incident on the surface of the strengthened glass substrate in the shielded region.

5. The method as claimed in claim 1 wherein:
    the laser beam illuminates an elliptical beam spot on the surface of the strengthened glass substrate;
    the cooling jet produces a cooling spot within the elliptical beam spot as the laser beam and the cooling jet is translated on the surface of the strengthened glass substrate; and
    heat generated by the elliptical beam spot and quenching provided by the cooling spot create a vent front that propagates below the compressive surface layer of the strengthened glass substrate.

6. The method as claimed in claim 5 wherein:
    the elliptical beam spot comprises a major axis and a minor axis on the compressive surface layer such that the major axis is aligned with a scribing direction; and
    a width b of the minor axis of the elliptical beam spot is determined by:

$$b = \frac{P}{I_{max}} \cdot \frac{1}{\pi/4 \cdot a + v},$$

where:
        a is a length of the major axis of the elliptical beam spot;
        P is a power of the laser beam;
        $I_{max}$ is a maximum permissible laser power density; and
        v is a scribing speed of the laser beam and the cooling jet on the surface of the strengthened glass substrate.

7. The method as claimed in claim 1 wherein:
    the cooling jet is operated at a stable temperature that is less than an ambient temperature; and
    a diameter d of a cooling spot produced by the cooling jet is determined by:

$$d = \frac{l^2}{4D} \cdot v$$

where:
        l is a depth of layer value;
        D is a thermal diffusivity of the strengthened glass substrate; and
        v is a scribing speed of the laser beam and the cooling jet on the surface of the strengthened glass substrate.

* * * * *